United States Patent [19]

Piepho

[11] Patent Number: 4,693,819

[45] Date of Patent: Sep. 15, 1987

[54] TREATMENT OF EMULSIONS AND INDUSTRIAL WASTE WATERS

[75] Inventor: Ralf F. Piepho, Wennigsen, Fed. Rep. of Germany

[73] Assignee: Ralf F. Piepho Abwassertechnik GmbH, Wennigsen, Fed. Rep. of Germany

[21] Appl. No.: 939,171

[22] Filed: Dec. 8, 1986

[30] Foreign Application Priority Data

Jan. 15, 1986 [DE] Fed. Rep. of Germany ....... 3600935

[51] Int. Cl.⁴ ............................................. B01D 21/08
[52] U.S. Cl. ..................................... 210/202; 210/207; 210/262; 210/297; 210/526
[58] Field of Search ............... 210/203, 205, 207, 210, 210/216, 241, 248, 260, 261, 262, 400, 526, 298, 297, 202

[56] References Cited

U.S. PATENT DOCUMENTS

| | | | |
|---|---|---|---|
| 3,409,275 | 11/1968 | Miller et al. | 210/526 X |
| 3,473,661 | 10/1969 | Duff | 210/203 X |
| 3,674,145 | 7/1972 | Schmutzler et al. | 210/526 X |
| 4,042,507 | 8/1977 | Longmack | 210/400 X |
| 4,104,168 | 8/1978 | Kiss | 210/526 X |
| 4,366,058 | 12/1982 | Wolde-Michael | 210/526 X |
| 4,394,272 | 7/1983 | Damerau | 210/298 X |
| 4,477,358 | 10/1984 | Heintges et al. | 210/210 X |
| 4,515,607 | 5/1985 | Wolde-Michael | 210/298 X |
| 4,595,499 | 6/1986 | Kormanik et al. | 210/202 |

Primary Examiner—Tom Wyse
Attorney, Agent, or Firm—Lockwood, Alex, FitzGibbon & Cummings

[57] ABSTRACT

Apparatus for treating emulsions and industrial waste waters includes a reaction container in which the fluid to be treated is treated with a chemical mixture and a settling container in contact with the same in which the settling precipitate separates and settles from the fluid. Devices for discharging the precipitate from the container and devices for dividing the chemical mixture among the fluids to be treated are also provided.

20 Claims, 7 Drawing Figures

TREATMENT OF EMULSIONS AND INDUSTRIAL WASTE WATERS

BACKGROUND AND SUMMARY OF INVENTION

This invention generally relates to apparatus for treating waste water and, more particularly, to apparatus for treating used emulsions and industrial waste waters which has a rectangular, box-like shape with a reaction container in which the fluid to be treated is mixed with a chemical mixture; a settling container in contact with the same in which the forming precipitate separates and settles from the fluid; as well as devices for discharging or transporting the precipitate from the settling container, and devices for dividing the chemical mixture among the fluids to be treated.

German disclosure document No. 31 24 738 describes an apparatus for treating used emulsions and industrial waste waters. In that apparatus, the precipitate is discharged from the settling container by means of a honeycomb band and released on an oblique surface from which it finally flows into a basin in a band filter. The precipitate, which is transported away in this manner from the settling container, still contains abundant water, so that it can flow away on this obliquely inclined surface.

On the band filter, which is a water-permeable cellulose or fibrous structure, the precipitate loses a portion of its water before finally flowing to a special device in which the band filter travels through pressure rollers which remove additional water. Such apparatus is bulky and expensive and requires a great deal of space and, because of the band filter and the pressure rollers, also entails considerable investment and maintenance costs. Furthermore, the flowing waste water necessitates a storage device extending over practically the entire lower area and a separate pipeline is required for the transport of the waste water.

It is the task of the present invention to provide an apparatus of the aforementioned type which, however, is compact, in which the reaction container, the settling container and other parts accommodating the waste water are sealed so that even during tilting tipping and swinging motions, no fluids spill, such as, for example, if the device is installed onboard a ship, and which has a simple, easy to monitor, maintenance-free construction.

In accordance with the invention, this task is solved through the fact that the containers which accommodate the fluids are box-shaped with straight walls. The precipitate in the settling container is discharged therefrom by means of a honeycomb band which slides with its external surfaces between opposing sidewalls and above the base so as to exit the container through slots which are dimensioned to correspond to the cross-section of the honeycomb band. The precipitate proceeds through the slots to the outside of the container above the precipitate storage tank.

The honeycomb band, which has a width corresponding to that of the settling container, follows a rectangular path over three guide rollers and one drive roller. Two of the guide rollers for the honeycomb band lie in the opposing corners formed by the intersection of the sidewalls and the base, while the third guide roller lies vertically above one of the lower rollers. The drive roller is positioned vertically above the other lower roller.

A channel-like guide for the honeycomb band is formed between each vertically-standing sidewall and an additional inner sidewall which is positioned parallel to each sidewall at a distance therefrom which is slightly greate than the thickness of the honeycomb band. The honeycomb band is an endless band and consists of two horizontal portions which lie opposite one another and two likewise opposed vertical portions.

The honeycomb band thus forms a rectangular loop which extends far enough over the container, which accommodates the fluid between the vertical endpieces of the honeycomb band, so that a storage container for the precipitate can be inserted to receive the precipitate falling from the upper horizontal endpiece. The emptying of the honeycomb band in the upper horizontal endpiece is achieved by the use of a tapping device, which rhythmically strikes against the upper horizontal surface of the honeycomb band.

The honeycomb band is driven by an electric motor with a regulating gear unit. A drive roller, preferably having two toothed rims, is provided wherein the rims engage two corresponding honeycomb unit rows of the honeycomb band in order to drive the honeycomb band.

The honeycomb band moves, corresponding to the formation of the precipitate, relatively slowly over the base of the settling container so that the precipitate that flakes and precipitates out of the fluid settles onto the honeycomb band and, during the motion of the honeycomb band, is moved therewith and transported upward out of the settling container.

As the precipitate in the honeycomb band moves upward outside the settling container, it dehydrates because of the long residence time to such a degree that a compression device or the like is not necessary, as it is in the prior apparatus.

The apparatus is provided with inlet and outlet pipes through which the waste water to be treated can be let in and the treated waste water can be discharged, respectively. In this manner, a practically continuous operation is possible with the apparatus of the present invention.

The fluid exiting from the apparatus is clarified to such a degree that it can be directed to a preliminary channel or can also, if the device is installed on a ship, be directed to a corresponding space in the double base which can then be emptied during the next harbor stay.

The receiver container can be a basin which is capable of tipping so that the sediment or precipitate settling out can be emptied directly into disposable packages or plastic sacks.

Instead of the tipping basin, other devices for the removal of the precipitate settling out of the honeycomb band are conceivable, such as, for example, a basin which is V-shaped in cross-section whereby the sidewalls of this V shaped basin are inclined to the vertically-standing endpiece of the honeycomb bands which lie opposite one another. This basin has a circular cross-section base and contains a conveying unit which feeds the precipitate into a tube which is connected with a receiving container.

The box containing the reaction and settling containers is sealed at the top by means of a plate and has only slot shaped openings through which the honeycomb band passes. The honeycomb band emerges upwardly from the container passing through the slot shaped opening and, reenters the container by passing through another slot-shaped opening on the opposite side of the container after it has covered a U-shaped path above the surface of the container.

Thus, the contents of the settling container are sealed so that fluid can not escape during tipping.

BRIEF DESCRIPTION OF THE DRAWINGS

The invention will now be described in greater detail by means of the following drawings, which present one form of execution of the apparatus.

DESCRIPTION OF THE PREFERRED EMBODIMENT

The preferred embodiment of the waste water treatment apparatus of the present invention comprises a box-shaped part indicated generally at 1 which houses the container in which the reaction between the waste water and the separating agent proceeds, and the container in which the reaction mixture resides, and a precipitate separates and settles to the base.

Figure 1:
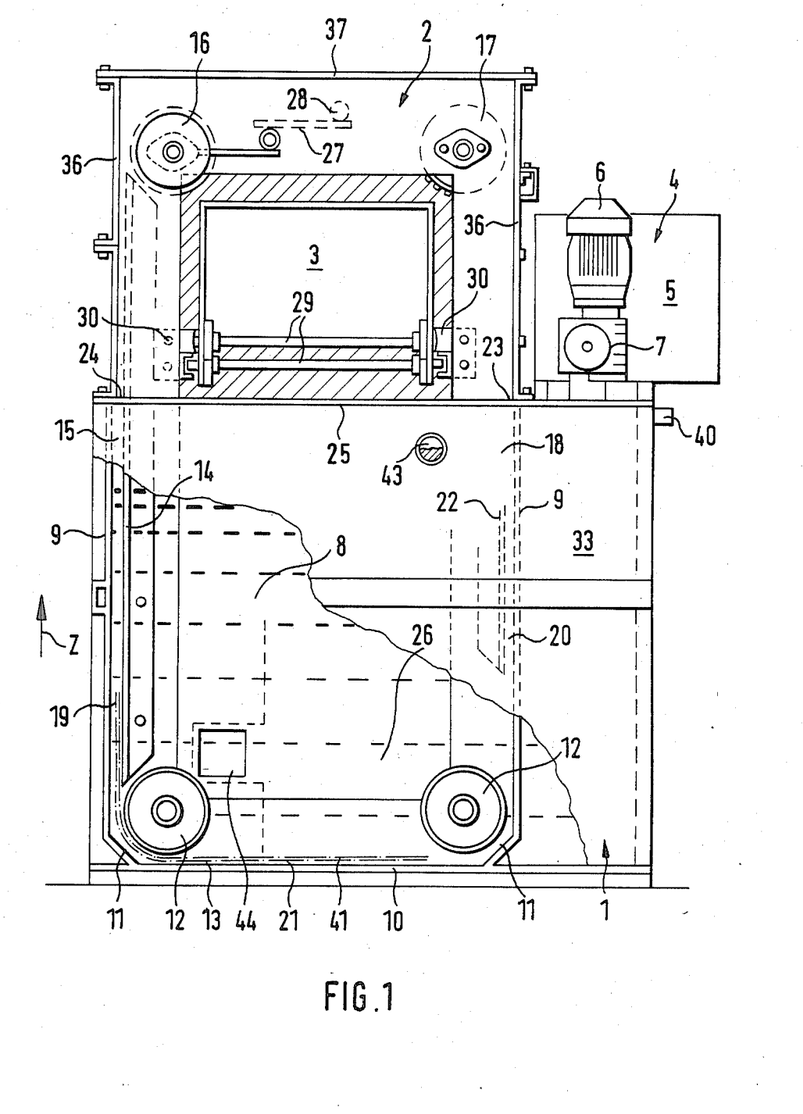
FIG. 1 is a front elevation view of the apparatus, partially broken away, as viewed substantially in the direction indicated by arrow I in FIG. 6.

As shown in FIG. 1, the apparatus further comprises a bridge-like assembly indicated generally at 2, which rests on the container, and beneath which a storage container 3 may be inserted. A dosing device 4 includes a supply container 5 holding the separating agent, an electric motor 6 with a gear unit and a dosing conveyor 7.

It can be clearly seen in FIG. 1 that the settling container 8, in which the fluid diluted with the separating agent is contained, has even, smooth sidewalls 9 and also an even base 10. One guide roller 12 is rotatably positioned in each of the corners 11 of the settling container formed by the intersection of the sidewalls 9 and the base 10. An endless honeycomb band 13 travels around these rollers to the left, as viewed in FIG. 1, and up to an upper guide roller 16 by passing through a channel 15 located between outer sidewall 9 and a parallel inner sidewall 14. The honeycomb band 13 is routed around upper guide roller 16, which is rotatably mounted near the bridge assembly 2, and runs to the right, as viewed in FIG. 1, to a drive roller 17 in order to finally move vertically downward through a corresponding guide channel 18 to the guide and deflecting roller 12. Channel 18 is located between outer sidewall 9 and parallel inner sidewall 22.

The honeycomb band 13 thus has two vertically running portions 19 and 20 and two horizontally running portions; the one which is located between rollers 16 and 17 is, for the sake of clarity, not depicted in the drawings. The honeycomb band thus follows, as is clear from FIG. 1, a rectangular path whereby a lower horizontal portion 21 and the lateral portions 19 and 20 slide along the sidewalls 9 and the base 10.

The sidewalls which form pairs, namely 9, 14 and 9, 22, are positioned such that the honeycomb band 13 can proceed therebetween with only a slight clearance before finally passing through two slit-shaped openings, roughly at 23 and 24, in a cover plate 25 of the container in order to proceed through the bridge-like assembly 2. Because of the close clearance therebetween, the channels 15 and 18 and the honeycomb band 13 create a seal so that the apparatus of the present invention can undergo tilting, swinging and tipping movements without the fluid 8 spilling out of the reaction container or the settling container 26, as shown in FIG. 5.

Figure 6:
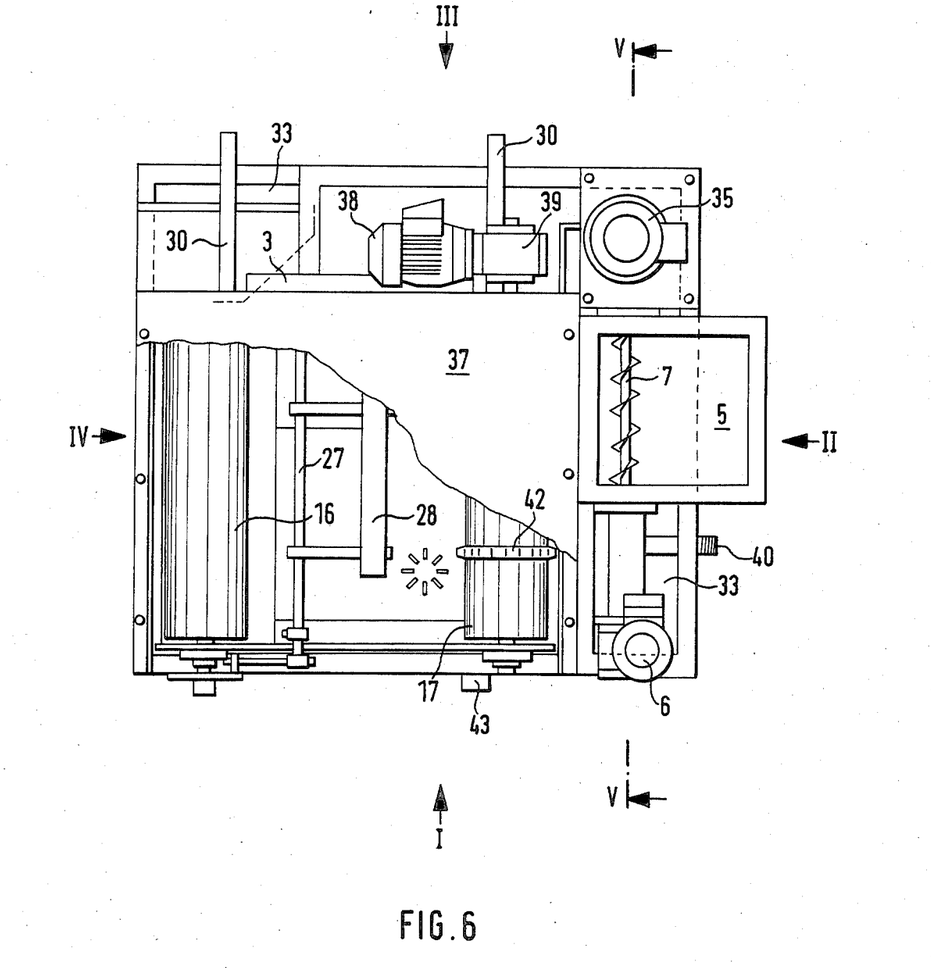
FIG. 6 is a top plan view of the apparatus, partially broken away.

A tapping device 27, as shown in 6, which is activated by the guide roller 16, is positioned in the bridge-like assembly 2. This tapping device causes a bar 28 to strike against the honeycomb band 13 in order to help remove the precipitate from the band. The manner of operation and the function of the individual parts will be described further below.

Figure 4:
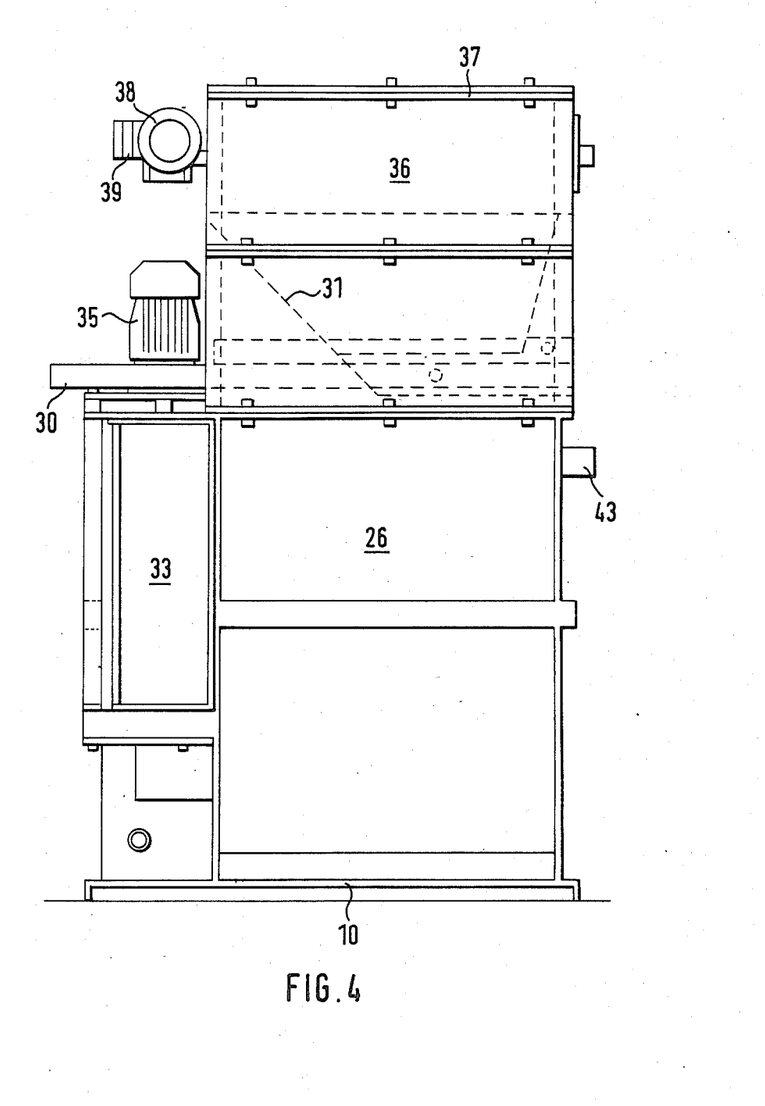
FIG. 4 is an end elevation view of the apparatus, as viewed substantially in the direction indicated by arrow IV in FIG. 6.

The storage container 3 has pins or bars 29 positioned on its casing in guide rails 30 that are attached to the vertical sides of the bridge assembly 2. As a result of this configuration, container 3 can be moved back and forth relative to the bridge assembly 2 in such a manner that it can be positioned either below the honeycomb band, as indicated by 31 in dotted lines in FIG. 4, or in a tilted position, as indicated by 32 in FIG. 5, in which the storage container 3 can be emptied. This one form of the storage and transport of sediment or precipitate can naturally be solved in other ways.

Figure 5:
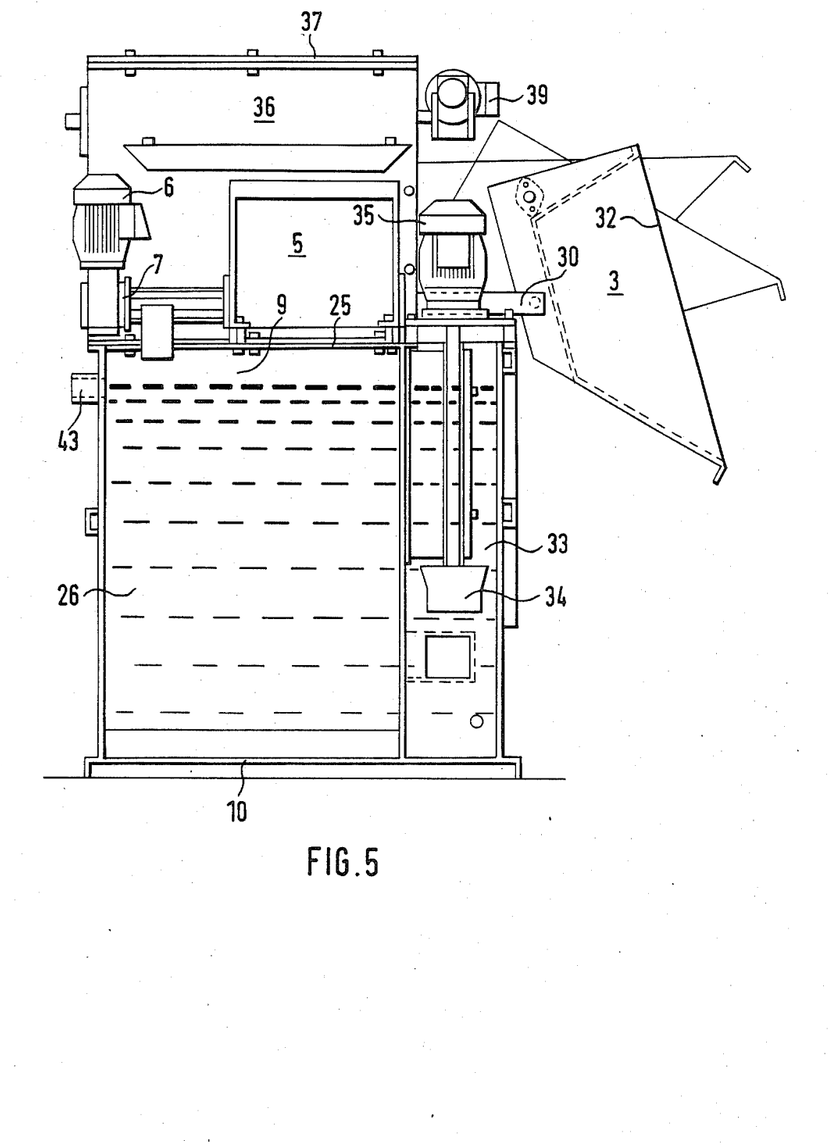
FIG. 5 is a cross-sectioned view of the apparatus, as viewed substantially along line V—V of FIG. 6.

In FIG. 5, the reaction container 33 can be seen, along with the mixing turbine 34, which is driven by an electric motor 35, as well as the separating agent supply container 5 with its dosing device 4, which consists of an electric motor 6 and a screw conveyor 7.

Figure 3:
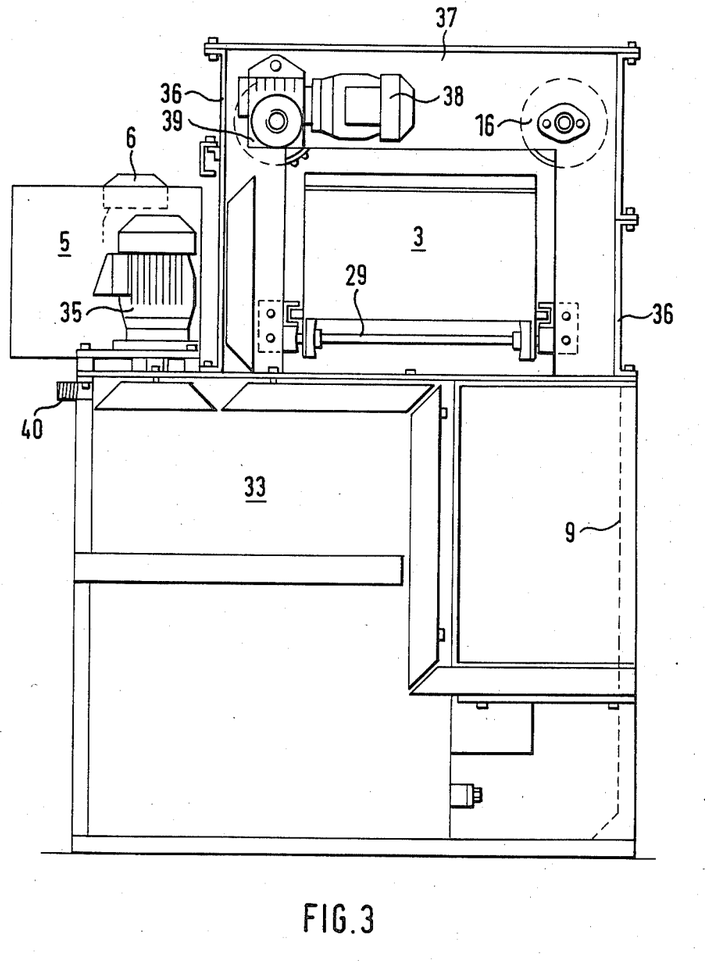
FIG. 3 is a side elevation view of the apparatus, as viewed substantially in the direction indicated by arrow III in FIG. 6.

The bridge-like assembly 2 is formed from sheet metal having a cover 37 and sidewalls 36 to which the drive and guide devices for the honeycomb band are attached. Drive roller 17, which drives the honeycomb band, is driven by an electric motor 38, as shown in FIG. 3, having a regulating gear unit 39 for regulating the rotational velocity of the honeycomb band.

Figure 2:
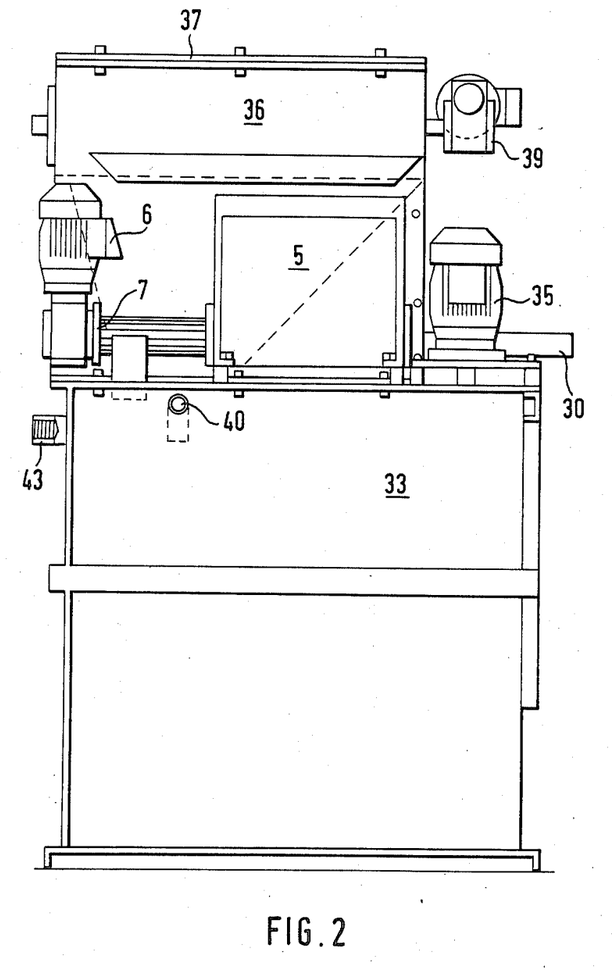
FIG. 2 is a side elevation view of the apparatus, as viewed substantially in the direction indicated by arrow II in FIG. 6.

The industrial waste water to be treated or purified, for example, an emulsion of fats, waxes or oils in a large volume of water, runs through a pipe 40, as shown in FIG. 2, into the reaction container 33 and is mixed therein with a predetermined specific quantity of a known separating agent based on the degree of contamination. This separating agent is stored in the container 5 above the dosing conveyor screw 7 and is driven by the gear unit motor 6.

The mixing turbine 34, which is driven by the electric motor 35 as shown in FIG. 5, produces a turbulent current in the waste water contained within the reaction container 33 and thereby disperses the separating agent in the waste water so that it can react with the other emulsified substances contained therein.

The waste water which has been treated for a predetermined length of time flows into the reaction container 26 in which the treated waste water resides for a certain period of time, so that the reaction between the separating agent and the substances to be removed can proceed. In such a reaction a precipitate forms which falls to the base 10 of the settling container and thus, as is shown in FIG. 1, onto the honeycomb band 13.

The honeycomb band moves in FIG. 1, for example, in the direction of the arrow "Z" so that the precipitate is caught in the individual honeycomb structures 41 of the honeycomb band 13 and is transported over the storage container 3. Once over storage container 3, the precipitate falls into the storage container due to the force of gravity and, if necessary, with the assistance of the tapping device 27. As soon as the storage container is full, it is, as shown in FIG. 5, moved to the right and tilted and the precipitate is released into another storage container such as a sack or the like. Since the honeycomb band 13 is driven very slowly in the direction of the arrow Z, the slurry can be dehydrated during its upward movement as it emerges from the water in the settling container 26, and thus can be released relatively dry into the storage container 3.

After the honeycomb band has released its contents in the form of precipitate into the storage container 3, it moves to the right, as shown in FIG. 1, around the drive roller 17. Drive roller 17 is provided with serrations on its circumference, as shown at 42 in FIG. 6, and thus sets the honeycomb band 13 into movement downward through channel 18 located between outer sidewall 9 and inner sidewall 22 so that it can again pick up precipitate as it crosses over the surface of the base 10. The clarified or purified waste water flows off through the pipe 43 as shown in FIG. 1.

Since the apparatus is sealed, the cycle takes place through the pipe 40, and the waste water must take a preset, forced path from the reaction container 33, which angularly surrounds the settling container, into the settling container through the opening 44 and out again through the pipe 43 so the device can be operated practically continuously.

Figure 7:
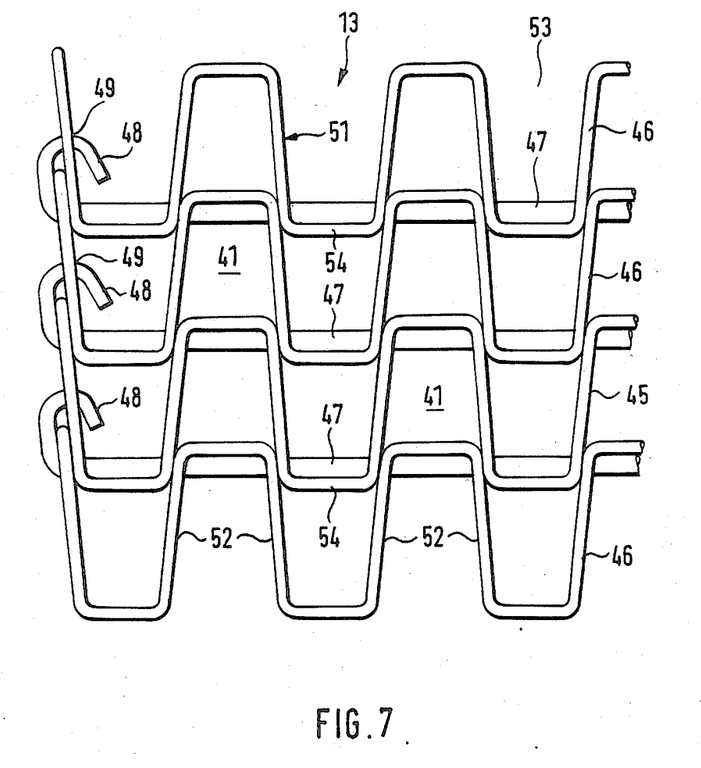
FIG. 7 is a top plan view of a section of the honeycomb band.

As shown in FIG. 7, the honeycomb band 13, which is used in accordance with the invention is partially depicted. The honeycomb band consists of sheet metal strips 51 which are bent in a wave-like shape and assembled to form honeycomb structures. If desired, these strips can be heat-tempered in order to improve their resistance to corrosion. The sidewalls 52 of the honeycomb band strips 51 run divergently to the higher opening 53 so that the lower bars 54 of the honeycomb band strips can project into the open ends 53 to such a degree that the individual wave-like sheet metal strips 45 and 46 can be connected in a swiveling manner with one another by rods 47. The rods 47 are passed through the individual strips and secured on their ends at 48 by bending the end and inserting same into boreholes 49 in the strips which are provided for that purpose. In this manner, honeycomb-like chambers 41 are formed of relatively constant volume which, together with the wall surfaces, form hollow spaces, in which the precipitate can be transported.

The container 5 which stores the mixture of chemical and separating agents can be sealed by a lockable cover, so that the discharge of separating agents can be prevented. The supply container 5 is sized so that additional separating agent can be stored in order to provide for longer continuous operation of the device.

The apparatus of the invention is basically constructed in a simple manner from sheet metal which is partially flanged and connected by means of welding and screws. The various individual assemblies, such as the dosing device drive and the mixing turbine, are integrated units and can, if necessary, be changed easily to facilitate ease of maintenance.

From the above description and the drawings, it will be seen that the apparatus of the present invention is a compact unit which is accessible from all sides and, in particular, has sealed reaction and settling containers for the fluid to be treated. In addition, an effective device for removing the precipitate which results during the purification process is also provided. Accordingly, the apparatus may be especially useful onboard a ship, for example, for treating oil-bearing bilge water or other oil-containing waste water. The waste water leaving the device has such a degree of purity that it can be discharged from the ship.

It will be understood that the embodiment of the present invention which has been described herein is merely illustrative of an application of the principles of the invention. Numerous modifications may be made by those skilled in the art without departing from the spirit and scope of the invention.

What is claimed is:

1. Apparatus for treating emulsions and industrial waste water and the like, said apparatus comprising:
   a reaction container in which a fluid to be treated and a separating agent are mixed whereby a precipitate is formed;
   a box-shaped settling container having a smooth bottom and a pair of spaced inner and outer sidewalls spaced apart from each other to define channels, said precipitate settling to the smooth bottom of said settling container;
   discharge means for discharging said precipitate from said settling container, said discharge means including an endless honeycomb band of a defined cross sectional shape and drive means for driving said honeycomb band over said smooth bottom and through said sidewall channels for carrying said precipitate out of said settling container;
   an opening from said settling container through which said endless band carrying said precipitate passes out of said settling container, said opening substantially corresponding in shape to the cross-sectional shape of said endless band;
   storage means for storing said precipitate; and
   guide means for directing said endless band over said storage means, whereby the precipitate is discharged to said storage means from said endless band.

2. The apparatus of claim 1, wherein said endless honeycomb band is driven in a generally rectangular path which includes two generally vertical portions and two generally horizontal portions and wherein said endless band travels through a bridge assembly positioned above said settling container, and said precipitate storage means being displaceably positioned within said bridge assembly.

3. The apparatus of claim 2, wherein said channels extend above the top of said settling container.

4. The apparatus of claim 3, including mounting means for said storage means permitting movement of said storage means between a first position located within said bridge assembly and a second position located outside said bridge assembly and a tilting position when said storage means is located at said second position.

5. The apparatus of claim 2, including mounting means for said storage means permitting movement of said storage means between a first position located within said bridge assembly and a second position located outside said bridge assembly and a tilting position when said storage means is located at said second position.

6. The apparatus of claim 2, including tapping means for tapping a portion of said endless honeycomb band located above said storage means.

7. The apparatus of claim 6, wherein said drive means comprises a drive roller, a motor having gear means for driving and regulating the rotational speed of said drive roller, said drive roller having toothed ring means drivingly engaging said endless honeycomb band.

8. The apparatus of claim 2, wherein said drive means comprises a drive roller, a motor having gear means for driving and regulating the rotational speed of said drive roller, said drive roller having toothed ring means drivingly engaging said endless honeycomb band.

9. The apparatus of claim 1, wherein said reaction container and said settling container are both sealed by a plate, said opening being formed in said plate.

10. The apparatus of claim 9, wherein said channels extend above the top of said settling container.

11. The apparatus of claim 1, wherein said channels extend above the top of said settling container.

12. The apparatus of claim 11, including mounting means for said storage means permitting movement of said storage means between a first position located within said bridge assembly and a second position located outside said bridge assembly and a tilting position when said storage means is located at said second position.

13. The apparatus of claim 12, including tapping means for tapping a portion of said endless honeycomb band located above said storage means.

14. The apparatus of claim 13, wherein said drive means comprises a drive roller, a motor having gear means for driving and regulating the rotational speed of said drive roller, said drive roller having toothed ring means drivingly engaging said endless honeycomb band.

15. The apparatus of claim 11, including tapping means for tapping a portion of said endless honeycomb band located above said storage means.

16. The apparatus of claim 11, wherein said drive means comprises a drive roller, a motor having gear means for driving and regulating the rotational speed of said drive roller, said drive roller having toothed ring means drivingly engaging said endless honeycomb band.

17. The apparatus of claim 1, including mounting means for said storage means permitting movement of said storage means between a first position located within said bridge assembly and a second position located outside said bridge assembly and a tilting position when said storage means is located at said second position.

18. The apparatus of claim 17, wherein said drive means comprises a drive roller, a motor having gear means for driving and regulating the rotational speed of said drive roller, said drive roller having toothed ring means drivingly engaging said endless honeycomb band.

19. The apparatus of claim 1, including tapping means for tapping a portion of said endless honeycomb band located above said storage means.

20. The apparatus of claim 1, wherein said drive means comprises a drive roller, a motor having gear means for driving and regulating the rotational speed of said drive roller, said drive roller having toothed ring means drivingly engaging said endless honeycomb band.

* * * * *

UNITED STATES PATENT AND TRADEMARK OFFICE
CERTIFICATE OF CORRECTION

PATENT NO.   :   4,693,819

DATED        :   September 15, 1987

INVENTOR(S)  :   Ralf F. Piepho

It is certified that error appears in the above-identified patent and that said Letters Patent is hereby corrected as shown below:

Column 1, line 45, after "tilting" insert a comma --,--.
    Column 2, line 5, delete "greate" and insert --greater--.
    Column 2, line 64, delete "slot shaped" and insert --slot-shaped--.
    Column 2, line 66, delete "slot shaped" and insert --slot-shaped--.

Signed and Sealed this

Twenty-second Day of March, 1988

Attest:

DONALD J. QUIGG

*Attesting Officer*    *Commissioner of Patents and Trademarks*